US011056147B2

(12) United States Patent
Nivas et al.

(10) Patent No.: US 11,056,147 B2
(45) Date of Patent: Jul. 6, 2021

(54) AUTOMATED CONVERSION OF TEXT BASED PRIVACY POLICY TO VIDEO

(71) Applicant: Tata Consultancy Services Limited, Mumbai (IN)

(72) Inventors: Shree Nivas, Pune (IN); Vijayanand Mahadeo Banahatti, Pune (IN); Sachin Premsukh Lodha, Pune (IN); Gokul Chettoor Jayakrishnan, Pune (IN); Mangesh Sharad Gharote, Pune (IN); Arun Ramamurthy, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 16/999,565

(22) Filed: Aug. 21, 2020

(65) Prior Publication Data

US 2021/0098021 A1    Apr. 1, 2021

(30) Foreign Application Priority Data

Aug. 23, 2019    (IN) .............................. 201921034112

(51) Int. Cl.
*G11B 27/031* (2006.01)
*G06F 16/75* (2019.01)
(Continued)

(52) U.S. Cl.
CPC ............ *G11B 27/031* (2013.01); *G06F 16/75* (2019.01); *G06F 40/30* (2020.01); *G06Q 10/10* (2013.01); *G11B 27/102* (2013.01)

(58) Field of Classification Search
USPC .................................. 386/239–248, 278–290
See application file for complete search history.

(56) References Cited

U.S. PATENT DOCUMENTS

2017/0098324 A1\* 4/2017 Srinivasan ............ G06F 16/345
2019/0295533 A1\* 9/2019 Wang ...................... G10L 25/90

FOREIGN PATENT DOCUMENTS

WO    WO2013140263 A2    9/2013

OTHER PUBLICATIONS

Baradwaj Naga Srinivasa Aryasomayajula, "Machine Learning Models for Categorizing Privacy Policy Text", Jul. 2, 2018, *MS, University of Cincinnati, Engineering and Applied Science.*
(Continued)

*Primary Examiner* — Hung Q Dang
(74) *Attorney, Agent, or Firm* — Finnegan, Henderson, Farabow, Garrett & Dunner, LLP

(57) ABSTRACT

This disclosure relates generally to automatic conversion of text-based privacy policy (PP) to video format. Typically, the PP are cognitively loaded with the content and hence difficult to read and understand. The disclosed method and system facilitate in automatic conversion of text-based PP to video format. Said video formats may incorporated in animated forms for ease of understanding of the user. The disclosed system identifies segments from target PP and maps them to template PP segments stored in a template repository. The template PP segments selected from the template repository are mapped to short video templates or snippets stored in a video repository to identify video templates representative of the selected template segments. The selected video templates are sequenced in an optimal manner considering preferences and dependencies to obtain the portions of or complete target PP.

11 Claims, 10 Drawing Sheets

(51) Int. Cl.
*G06F 40/30* (2020.01)
*G11B 27/10* (2006.01)
*G06F 40/186* (2020.01)
*G06F 40/284* (2020.01)
*G06K 9/00* (2006.01)
*G06Q 10/10* (2012.01)

(56) References Cited

OTHER PUBLICATIONS

Author: Ravikumar Vishwanath Chimmalgi, Automated Conversion of Text Instructions to Human Motion Animation, 2015, *Engineering Science (Interdepartmental Program)*.

\* cited by examiner

AUTOMATED CONVERSION OF TEXT BASED PRIVACY POLICY TO VIDEO

PRIORITY CLAIM

This U.S. patent application claims priority under 35 U.S.C. § 119 to: India Application No. 201921034112, filed on Aug. 23, 2019. The entire contents of the aforementioned application are incorporated herein by reference.

TECHNICAL FIELD

The disclosure herein generally relates to privacy policy management and, more particularly, to automatic conversion of a text-based privacy policy into a video format.

BACKGROUND

Most online services available nowadays operate by collecting and processing of users' information that increasingly contains more personal data, thus leading to serious privacy concerns. To mitigate them, over the years, privacy regulations and associated data protection frameworks have come up across the globe, which mandate an organization to provide notices to the data subjects about its data practices. Here, the "notice and choice" framework that was introduced as per Fair Information Practice Principles (FIPPs) has become a universal norm for disclosing privacy policy by the organizations and services being offered by them.

A 'Privacy policy' statement discloses the practices carried out by an organization to gather, use and, share users' data. Effective communication of privacy policies is challenging due to verbosity, legal jargon, complexity and lack of comprehensibility. Further, the need to consume (sometimes apparently free) online services by the end users may result in them turning a blind eye to the privacy notices. Many a times, Internet users are unaware of the privacy policies. Majority of users skip or ignore the privacy policy notices while joining a social network via internet for the first time. Even those who read privacy policies still struggle to grasp them. Online privacy policies often contain ambiguous language that undermines the purpose and value of the privacy policies for end users.

It has been noted that the text-based online privacy policy content is much more complex in comparison to what a user would be willing to read and spend time on. There are more struggles for the end users on the cards as privacy policies are laborious to look at, read, and understand. Policy documents attempt to serve different purposes for varied users, and focus more on the compliance and regulations than on consumers.

This has now become a more critical issue with the advent of the European Union's much touted General Data Protection Regulation (GDPR) that emphasizes on "privacy by default". It places the onus on users to make the right decision with regards to their personal data processing by organizations. Naturally, such call for action requires users to not only read, but also comprehend privacy notices well. Here, GDPR does ask organizations to make the communication pertaining to personal data processing transparent, intelligible and concise using plain language. While this has forced organizations to reconsider and rewrite their privacy policies, it has been observed that these updated policies contain even more incomplete and ambiguous information flow statements. Almost 45% of all pre-GDPR policies and 63% of the post-GDPR policies suffer from this flaw. In addition, the content in both previous and updated versions of privacy policies continue to suffer from "parameter bloating," leading to more verbose text. Studies have shown that post GDPR implementation, there was an average increase in word count of privacy policies of 25.88%. Also, the average change in reading level to comprehend the content increased from 13.6 to 14.1 by 3.68%.

Besides that, the language and terms used in the privacy policies obviate the end users from reading large textual content for understanding in context of their requirement. Most policies are written in English at a level suited for college level educated end users with frequent use of unfamiliar terminologies.

For upcoming regions like India and African countries (like Benin, Sierra Leone, Niger, and Mozambique), the rate of Internet penetration has been increasing by more than 20% annually. This includes a vast number of people with only school level education or less. In rural areas, smart phones and laptops are becoming the primary means of Internet consumption. For this kind of focus group, the current text-based policies remain ineffective and almost ignored. There is no inclusivity of these kind of user groups who cannot read or understand the online text-based privacy policies comprising of complex language. Also, non-availability of privacy statements in regional languages isolates a large group of people who do not understand English.

Additionally, in certain scenarios organizations may be interested in certain specific contents of the privacy policy. The privacy policies can be broadly categorized into categories including, but not limited to, Cookies, Personal Information and so on. Within each category there are distinct variations. For example, for the category 'cookies', segments may include, for instance, What is a cookie?, Do we Store Cookies?, How cookies Are Stored?, and so on. As previously mentioned, in example scenarios the organizations may be interested in understanding only a segment of a category (for example, how cookies are stored), and not the entire category (of Cookies).

SUMMARY

Embodiments of the present disclosure present technological improvements as solutions to one or more of the above-mentioned technical problems recognized by the inventors in conventional systems. For example, in one embodiment, a method for automatic conversion of a text-based privacy policy into a video format is provided. The method includes receiving an input associated with a privacy policy (PP) of a target entity, via one or more hardware processors, the input comprising a plurality of target PP segments Further, the method includes classifying, via the one or more hardware processors, the plurality of target PP segments by mapping the plurality of target PP segments with a plurality of template PP segments stored in a PP repository to obtain a set of mapped target PP-template PP segment pairs, wherein mapping is performed by determining a first closeness coefficient between each of the plurality of target PP segments and the plurality of template PP segments. Further, the method includes mapping, via the one or more hardware processors, the set of mapped target PP-template PP segment pairs with a plurality of video template segments stored in a video repository to obtain a set of mapped target PP-video template segment pairs, wherein the set of mapped target PP-video template segment pairs comprises a set of video template segments from amongst the plurality of video template segments, wherein mapping is performed by determining a second closeness coefficient between each of the set of mapped target PP-template PP segment pairs and the plurality of video template segments. Also, the method includes sequencing the set of video template segments in an optimal order based on one or more preferences associated with the target entity, via the one or more hardware processors.

In another aspect, a system for automatic conversion of a text-based privacy policy into a video format is provided. The system includes a memory storing instructions, one or more communication interfaces; and one or more hardware processors coupled to the memory via the one or more communication interfaces, wherein the one or more hardware processors are configured by the instructions to receive an input associated with a privacy policy (PP) of a target entity the input comprising a plurality of target PP segments. The one or more hardware processors are further configured by the instructions to classify the plurality of target PP segments by mapping the plurality of target PP segments with a plurality of template PP segments stored in a PP repository to obtain a set of mapped target PP-template PP segment pairs, wherein mapping is performed by determining a first closeness coefficient between each of the plurality of target PP segments and the plurality of template PP segments. Also, the one or more hardware processors are further configured by the instructions to map the set of mapped target PP-template PP segment pairs with a plurality of video template segments stored in a video repository to obtain a set of mapped target PP-video template segment pairs, wherein the set of mapped target PP-video template segment pairs comprises a set of video template segments from amongst the plurality of video template segments, wherein mapping is performed by determining a second closeness coefficient between each of the set of mapped target PP-template PP segment pairs and the plurality of video template segments. Furthermore, the one or more hardware processors are further configured by the instructions to sequence the set of video template segments in an optimal order based on one or more preferences associated with the target entity.

In yet another aspect, a non-transitory computer readable medium for a method for automatic conversion of a text-based privacy policy into a video format is provided. The method includes receiving an input associated with a privacy policy (PP) of a target entity, via one or more hardware processors, the input comprising a plurality of target PP segments. Further, the method includes classifying, via the one or more hardware processors, the plurality of target PP segments by mapping the plurality of target PP segments with a plurality of template PP segments stored in a PP repository to obtain a set of mapped target PP-template PP segment pairs, wherein mapping is performed by determining a first closeness coefficient between each of the plurality of target PP segments and the plurality of template PP segments. Further, the method includes mapping, via the one or more hardware processors, the set of mapped target PP-template PP segment pairs with a plurality of video template segments stored in a video repository to obtain a set of mapped target PP-video template segment pairs, wherein the set of mapped target PP-video template segment pairs comprises a set of video template segments from amongst the plurality of video template segments, wherein mapping is performed by determining a second closeness coefficient between each of the set of mapped target PP-template PP segment pairs and the plurality of video template segments. Also, the method includes sequencing the set of video template segments in an optimal order based on one or more preferences associated with the target entity, via the one or more hardware processors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 4A illustrates mapping of segments (or sentences) from the target PP to the template PP segments stored in the PP repository, in accordance with an example embodiment of the disclosure. FIG. 4B illustrates mapping of contents from the template PP segments to the video templates stored in the video repository, in accordance with an example embodiment of the disclosure. FIG. 4C illustrates sequencing of categories using a set of pre-computed sequences based on user preferences, in accordance with an example embodiment of the disclosure. FIG. 4D illustrates sequencing of video templates within categories of privacy policy using another set of pre-computed sequences based on user preferences, in accordance with an example embodiment of the disclosure.

DETAILED DESCRIPTION

Figure 1:
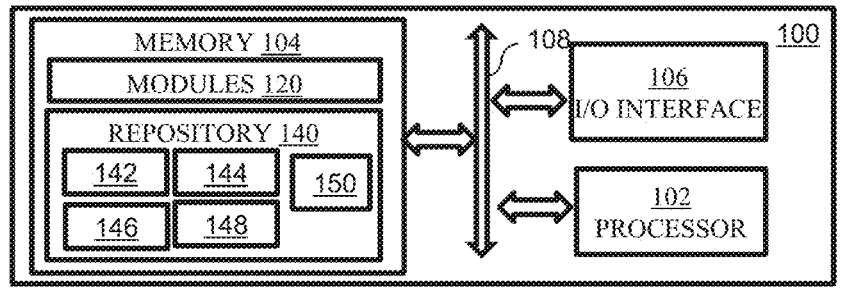
FIG. 1 illustrates a block diagram of a system for automated conversion of text-based privacy policy (PP) to video, according to some embodiments of the present disclosure.

Existing methods for design of online privacy statements include platforms for privacy statements and role of purpose in privacy requirements. The statements in privacy policy utilize privacy labels showing usage of users' data on a website by putting privacy policy information (e.g., in a tabular form). For example, the privacy requirements purposes for which user data may be used is the areas among the type of data collected, and whether or not data would be shared. The P3P (Platform for Privacy Preferences) Specification, which supports the purpose specification principle, shows a P3P vocabulary that includes eight major components, one of which is the "purpose" component, which relates to how collected data is being used, and whether individuals can opt-in or opt-out of any of these uses. It is pertinent for the organizations to make users aware about their data rights and usage by providing clear information related to their choices and data practices in privacy policy. However, there were multiple problems with P3P syntax such as allowing the same practice to be described in multiple ways, ambiguous definitions for some P3P policy elements, and a fairly convoluted syntax.

The privacy labels are effective for finding relevant information in online privacy policies, however they are not evaluated for scaling to other form of agreements. Further, few conventional methods convert the privacy policy in terms of data visualizations but translation of whole privacy statement into grid that conveyed information by icons does not improve its efficacy.

Most of the privacy statements includes a large amount of content in common which can be categorized in broader sections. Further, the privacy policies contain incomplete and ambiguous information flow statements. Besides that, language and terms used in the privacy policies obviate the end users from reading the large textual content for understanding in context of their requirement. Most policies are written at a level suited for mid-level educated end users with frequent use of unfamiliar terminologies. However, for people with only school level education and belonging to rural areas, existing text-based policies remain ineffective and almost ignored. There is no inclusivity of the kind of users who cannot read or understand online text-based privacy policies comprising of complex language. Thus, the typical text-based privacy policies poses challenges, such as ineffectiveness of text-based privacy policy statements, lack of comprehensibility to average user, issue of non-inclusiveness in light of increasing demographic variance, and so on.

Many studies have stated that reading privacy policies is related to economic proposition and concluded that asymmetric information makes the task of reading them not worthy. Some studies also reported that understanding privacy policies requires college level education. One study also pinpoints the rise of ambiguities due to the language of the content. Some research was also done to convert privacy policy in terms of data visualizations but again translating a whole privacy statement into a grid that conveyed information by icons did not improve its efficacy. Attempts for creating effective policy through visualizations are still going on including the modeled icons for Privacy after Creative Commons. CommonTerms also tried to resolve this with a standardized view based on review of a large number of available privacy policies and other standardization and iconography work.

Video is considered to be an effective medium for technical assistance and delivering information. An audio-visual medium may be a user friendly and widely accepted medium of communication. Choosing animation-based visuals as an alternative for delivering text-based content raises user motivation, improves communication and expands potential for deeper understanding of the subject concepts. Engaging user's focus towards a text-based content without visual elements is quite difficult. The interest towards understanding of content might differ with the differences in Need For Cognition (NFC). NFC refers to an individual's tendency to engage in and enjoy effort-full cognitive endeavors. The intent is to avoid users to get cognitively loaded with the content, so it is desirable to put end-users accessing the policy statements in the low NFC profile. Motion graphics is preferred by low NFC people, which allows them to see the transition from one frame to another demanding less inferential processing. Successive graphical representation with less information guides the learning model of viewers thus letting them go through a short story format instead of an open sea of information.

Various embodiments disclosed herein provides method and system that enables communication of online text-based privacy policy statements in the form of a video so as to effectively engage users towards understanding of the content of privacy policy. The video representation may be an alternative to the text-based content of the privacy policy document. In an embodiment, the video content includes animated graphics to form a video to convey the information of the privacy policy with a goal to reduce the cognitive load and easy knowledge transition. In an embodiment, the disclosed system combines various categories of available privacy policies to automate the conversion of the text-based policy into video. For example, in an embodiment the system maps the segments of the PP with the segments derived from existing PPs (stored in a repository), and then maps the identified PP segments with video segments (stored in a repository) to identify relevant video snippets corresponding to the segments of the privacy policy. The identified relevant video snippets are then arranged in an optimal sequence to obtain a video corresponding to the at least a portion of the privacy policy. Herein, the video may be obtained for different sections of the PP. Alternatively, the disclosed system may be capable stitching the videos corresponding to each of the sections of the PP and provide a video form of the text-based privacy policy.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through 5F, where similar reference characters denote corresponding features consistently throughout the figures, there are shown preferred embodiments and these embodiments are described in the context of the following exemplary system and/or method.

FIG. 1 illustrates a block diagram of a system 100 for automated conversion of text-based privacy policy to video, according to some embodiments of the present disclosure. The disclosed system 100 is capable of converting the text based privacy policy associated with an organization or a service offered by the organization into a video. In an embodiment, the system is capable of splitting the text of the privacy policy into multiple text segments and classifying them. The system 100 then automatically retrieves video snippets corresponding to the text segments from a video template repository that may include video snippets for various privacy policy segments. In an example embodiment, such video snippets may be in form of animations. In an embodiment, the video templates may be created and stored in the video template repository. In an example scenario, the video templates may be created by experts for the privacy policy segments already present in the PP template repository. The video template repository may be updated with video templates corresponding to any additional (or new) PP template segment.

When a new text privacy policy is provided as an input to the system 100, the system 100 maps the target privacy policy (PP) segments to template PP segments, and in this process, the target PP segments gets automatically classified by the system 100. Further, the system 100 maps the video templates to the template PP segments. In an example embodiment, while mapping the video templates with the template PP segments, the concerned users (for example, the organization associated with the) PP segments may also be taken into consideration, for improving the quality of mapping. The retrieved video snippets are sequenced in an optimal order based on user preferences. Herein, the 'user' may refer to the organization or a concerned individual representative from the organization.

The present disclosure modularizes the privacy policy into video format and reuse video modules to represent the privacy policies of different organizations. The present disclosure bridges gap between policy communications to the end users over long text-based policy statements. The disclosed method and the system are centered around conversion of the privacy policy (or a portion thereof) into modularized video snippets or video templates with respect to different categories involved in the privacy policy statements, and providing a platform to modify, customize and reuse the video templates to scale across different privacy policies of different organizations. The method of the present disclosure involves segmentation of conventional text-based privacy statements into distinct sections with similar agendas and then mapping short individual video snippets representing each section in animated visualization. The video snippets are then stitched together to represent the whole privacy statement/policy. The video thus formed may be modified according to theme structure of the target organization under consideration such as brand identity, color, theme, animated characters, voice, credits, language, subtitles, speed, sequencing and quality. The final output may represent an alternative for the online text-based privacy policy statement for the target organization. Herein, the target PP segments may be selected either from the entire target PP or from sub-sections or categories of the target PP, as per the requirement.

The system 100 includes or is otherwise in communication with one or more hardware processors such as a processor 102, at least one memory such as a memory 104, and an I/O interface 106. The processor 102, memory 104, and the I/O interface 106 may be coupled by a system bus such as a system bus 108 or a similar mechanism. The I/O interface 106 may include a variety of software and hardware interfaces, for example, a web interface, a graphical user interface, and the like The interfaces 106 may include a variety of software and hardware interfaces, for example, interfaces for peripheral device(s), such as a keyboard, a mouse, an external memory, a camera device, and a printer. Further, the interfaces 106 may enable the system 200 to communicate with other devices, such as web servers and external databases. The interfaces 106 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 106 may include one or more ports for connecting a number of computing systems with one another or to another server computer. The I/O interface 106 may include one or more ports for connecting a number of devices to one another or to another server.

The hardware processor 102 may be implemented as one or more microprocessors, microcomputers, microcontrollers, digital signal processors, central processing units, state machines, logic circuitries, and/or any devices that manipulate signals based on operational instructions. Among other capabilities, the hardware processor 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 120 and a repository 140 for storing data processed, received, and generated by one or more of the modules 120. The modules 120 may include routines, programs, objects, components, data structures, and so on, which perform particular tasks or implement particular abstract data types.

The repository 140, amongst other things, includes a system database 142 and other data 144. The other data 144 may include data generated as a result of the execution of one or more modules in the other modules 130. In an embodiment, the repository 140 may include a privacy policy repository and a video repository. The PP repository may include a plurality of privacy policy segments obtained from a plurality of PPs. The plurality of PPs may be obtained from existing organizations and/or online services. The video repository may include a plurality of video templates or video snippets in various formats. The plurality of PP segments and the plurality of video templates shall further be explained in the description below.

Figure 2:
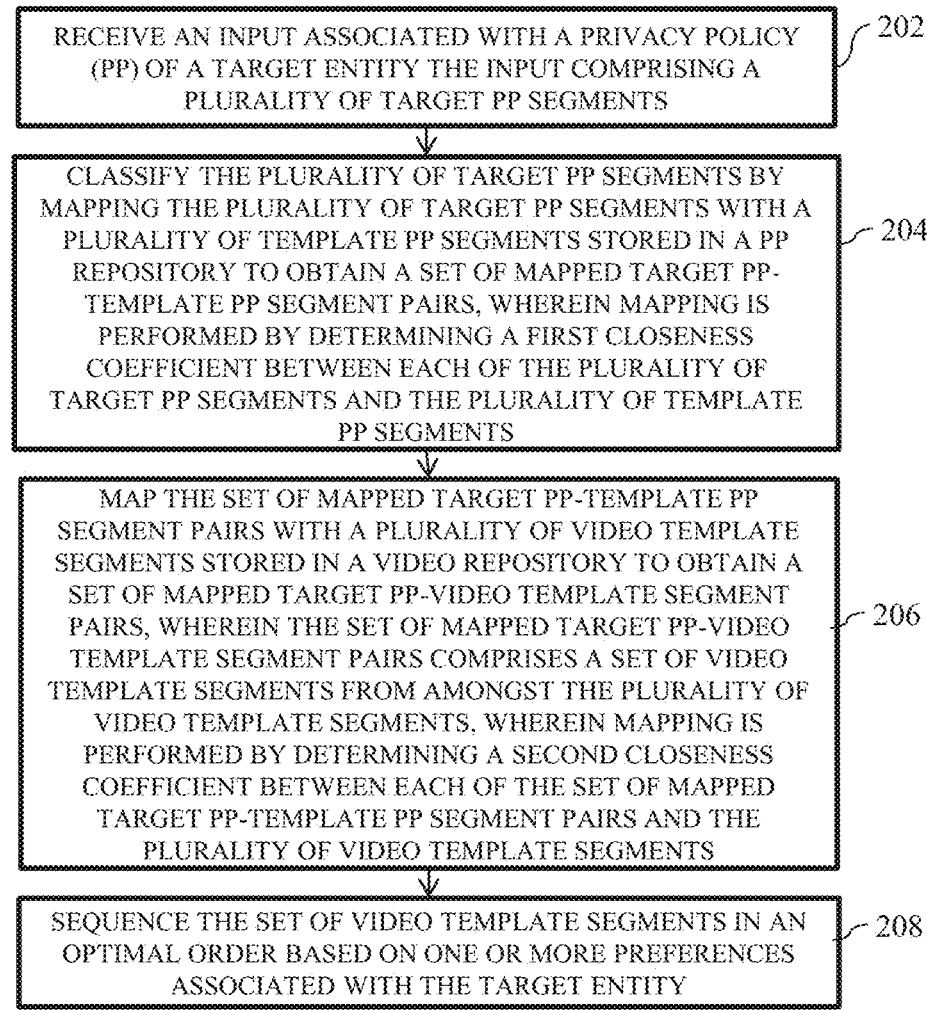
FIG. 2 is a flow diagram of a method for automated conversion of text-based PP to video is described in accordance with an example embodiment. a functional block diagram according to some embodiments of the present disclosure.

Referring to FIG. 2, a flow diagram of a method 200 for automated conversion of text-based privacy policy to video is described in accordance with an example embodiment. The method 200 depicted in the flow chart may be executed by a system, for example, the system, 100 of FIG. 1. In an example embodiment, the system 100 may be embodied in a computing device.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 200 are described with help of system 100. However, the operations of the method 200 can be described and/or practiced by using any other system.

At 202 of the method 200, the disclosed system 100 may receive an input associated with a privacy policy (PP) of a target entity via one or more hardware processors. The PP of the target entity may hereinafter be referred to as 'target PP'. In an embodiment, the target privacy policy may contain online privacy policy documents, structured policy documents, annotated documents by legal teams and machine annotated documents. In an embodiment, the input may include a text-based policy associated with the target entity. The text-based policy associated with the target entity may include one or more of, for example, a text document (such as PDF, .txt document, .word document, and so on), a weblink to the text based policy and so on. Herein, the target entity may be an organization for which the PP is to be converted to a video. In an embodiment, the target policy may include a plurality of sections such that each section may include an explanation in one or more sentences. In an embodiment, the content of the target PP may be split into a plurality of template PP segments. In an embodiment each segment of the plurality of template PP segments may include a sentence.

In an embodiment, the input may be split into the plurality of target PP segments by using a pretrained machine learning (ML) model. The ML model may be trained using a training data that may include, for example, a PDF document, a word document in DOC format or txt format, and/or a website URL of the organization under consideration. In case, when the received input is the website URL of the organization under consideration, the system of present disclosure scans for privacy document from the website and downloads file for processing. The downloaded file represents complete privacy policy (PP) of the organization under consideration. Additionally, or alternatively, the ML model may be trained using the template PPs stored in the PP repository. The ML model may be trained to identify a plurality of template PP segments and assign a label to the identified template PP segments. In an embodiment, the training data may be received from a plurality of users, wherein the plurality of users may include but are not limited to organization(s) similar to organization under consideration, employees of said organization(s), or users accessing website of such organization(s). In an example embodiment, the organization may belong to various sectors including, but not limited to, e-Commerce, retail, technology, entertainment, banking and finance. The organizations may further have varying degrees of their overall popularity, worldwide recognition, use and overall asset evaluation.

In an embodiment, the privacy policies being input to the ML model for training the ML model may include content that can be classified into various sections. For instance, the privacy policies may include content classified into various sections (and associated labels), including, but not limited to Collection of Information, Security, Sharing, User Choices, Cookies and so on. Each of the section of the PP may be assigned a label. Examples of label may include, but are not limited to, personal information, Cookies, information sharing, information security, third party advertisers, accessible Information, customer choices, children privacy policies, and privacy shield. An example of categorization of privacy policy with relevant content is described in TABLE 1. Herein, it will be understood that the example provided in table I is only for illustrative purposes and should not be construed as limiting to the embodiments.

TABLE I

Example of categorization of privacy policy with relevant content

| Sections defined for categorization of content in privacy policy | End-user relation with the content | Type |
|---|---|---|
| Personal Information | First Party Collection/Use | Collection of Personal Information |
| Cookies | Do Not Track | Cookies and Other Technologies |
| Information Sharing | Data Retention | Use of Collected Information, Legalities and Disclosure of Information |
| Information Security | Data Security | Information Storage and Security |
| Third Party Advetisers | Third Party Sharing/Collection | Third Party Information on Sharing |
| Accessible Information | User Access, Edit and Deletion Policy Change | Access Management of Personal Information, Changes/Updates to Privacy Policies, Contact |
| Customer Choices | User Choice/Control | Transparency and Choice, Opt in/out of Online Marketing |
| Children Privacy Policies Privacy Shields | International and Specific Audiences | Miscellaneous Privacy Related Materials, Global Operation |

At 204, the method 200 includes classifying, via the one or more hardware processors, the plurality of target PP segments by mapping the plurality of target PP segments with the plurality of template PP segments stored in the PP repository to obtain a set of mapped target PP-template PP segment pairs. The mapping is performed by determining a first closeness coefficient between each of the plurality of target PP segments and the plurality of template PP segments. Herein, the first closeness coefficient is indicative of closeness (or similarity) between the target PP and the template PP segments, as will be explained below with reference to FIGS. 3A and 3B.

Figure 3A:
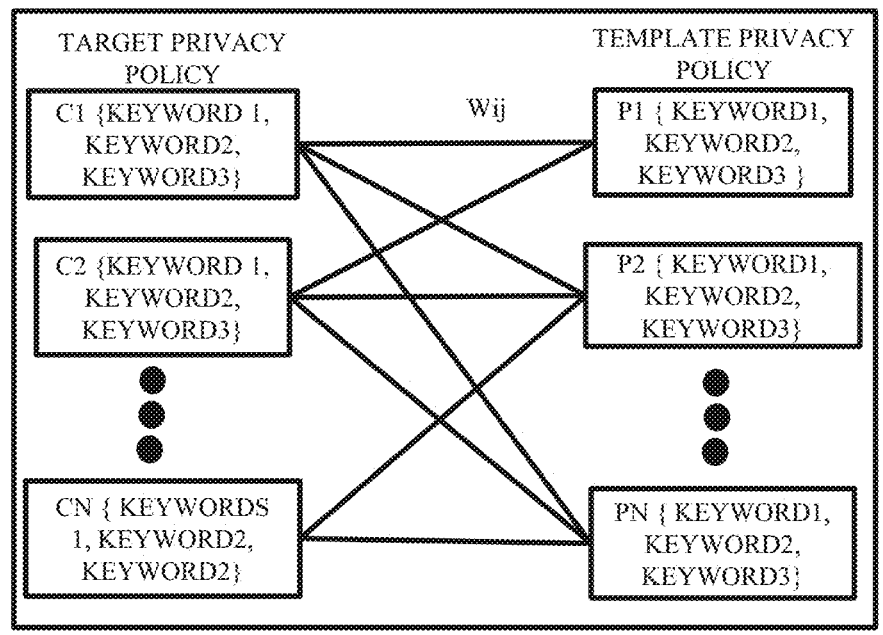
FIG. 3A illustrates an example representation of an overall process flow of mapping between a target PP and a template PP, in accordance with an example embodiment of the disclosure.
Figure 3B:
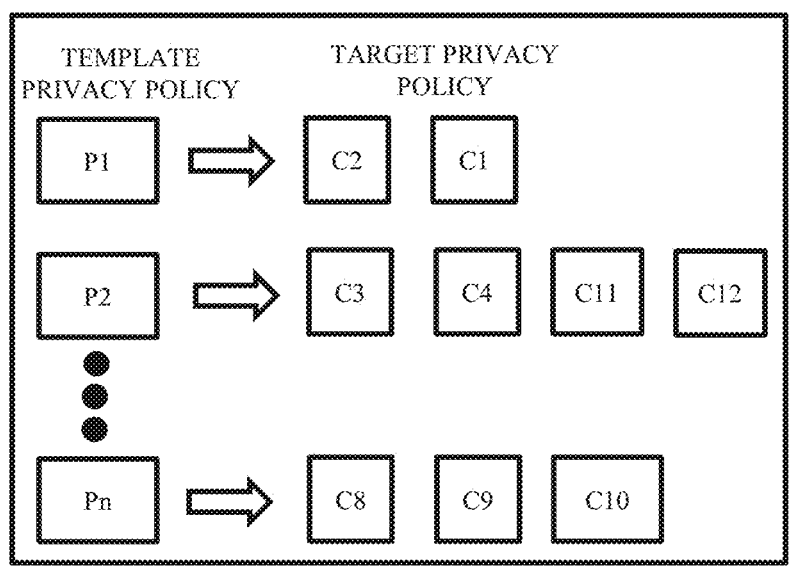
FIG. 3B illustrates an example representation of mapping of target PP segments with the template PP segments of FIG. 3A, in accordance with an example embodiment of the disclosure.
Figure 3C:
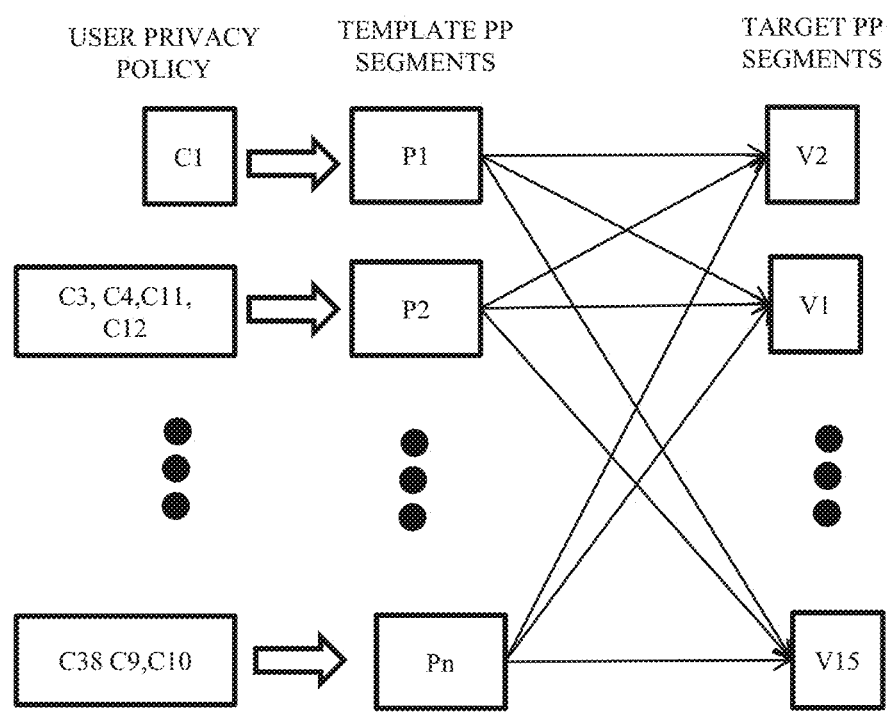
FIG. 3C illustrates an example representation of mapping of target PP-template PP segments of FIGS. 3A and 3B, in accordance with an example embodiment of the disclosure.

Referring to FIGS. 3A and 3B, computation of the first closeness coefficient between the target PP segment from amongst the plurality of target PP segments and a PP template segment from amongst the plurality of PP template segments is illustrated in accordance with an example embodiment. Particularly, FIG. 3A illustrates an overall process flow of mapping between the target policy and the template policy, in accordance with an example embodiment of the disclosure. FIG. 3B illustrate mapping of target PP segments with the template PP segments, in accordance with an example embodiment of the disclosure.

In an embodiment, the first closeness coefficient between a target PP segment from amongst the set of target PP segments and a template PP segment from amongst the set of template PP segments is computed as a function of semantic similarity and syntactic similarity associated with the target PP segment and at least one target PP segment preceding the target PP segment with respect to the plurality of template PP segments. In an embodiment, the system 100 compares the keywords in each sentence of the target PP with keywords derived from the template PP stored in the PP repository and computes the first closeness coefficient between them. An example of computation of the first closeness coefficient between the PP of the target entity and the stored PPs is shown below:

Let $m_{cp}$ represent the first closeness coefficient between $c^{th}$ sentence in the target PP with the $p^{th}$ privacy policy in the PP repository (or template policy). The value of $m_{cp}$ can be calculated based on a determination of semantic similarity and syntactic similarity between the keywords derived from the target PP and one or more template PPs.

$$m_{cp} = f(\text{semantic and syntactic similarity between the two contents or keywords})$$

In an example embodiment, the semantic similarity may be obtained by using models such as fastText model and a WuPalmer model. The syntactic similarity may be obtained by using models such as Ngram model. Hence, in the present example embodiment, the first closeness coefficient may be computed as:

$$m_{cp} = \text{func}(f(\text{fastText}), f(\text{WuPlamer}), f(\text{Ngram}))$$

Further, due to an ordered structure followed in the target privacy policy (PP), there is be a close association/connection between two consecutive sentences in each of the target PP segment (sections). Therefore, if a sentence in a target PP is closely matched with a sentence in a template PP, the next sentence in the target PP is likely to have a high closeness with the same segment of the PP template. Hence, the overall closeness between a sentence (c) in the target PP and a template policy (p) segment is defined as, $$w_{cp} = \lambda u_{c-1,c} w_{c-1,p} + (1-\lambda) m_{cp}$$

where, $u_{c-1,c}$ is the closeness coefficient between $c^{th}$ sentence and $(c-1)^{th}$ sentence in the target PP.

$\lambda (0 \leq \lambda \leq 1)$ is the weightage assigned to the mapping closeness of $(c-1)^{th}$ sentence of the target policy with $p^{th}$ template policy.

After computing $w_{cp}$ for all the sentences (or segments) of the target PP, mapping can be done between the target PP segments (or sentences) and segmented template PP stored in the repository. An example illustrating determination of closeness of a sentence in target policy with sections/sentences of template policy is provided below:

EXAMPLE

Let p=1 represent a PII policy in the template PP.

Let p=2 represent a Cookies policy in the template PP.

Let, matching between sentence 1 (or target PP segment) in the target PP and the PII policy (m_11) be 0.9 and a matching between sentence 1 in the target PP and cookies policy (m_12) be 0.1. Assuming $\lambda=0$ for first sentence in the target PP, w_11=0.9 and w_12=0.1.

The closeness for sentence 2 in the target PP with the template PP is computed. Let m_21=0.4, m_22=0.5. And closeness between sentences 2 and 1 (u_12) in the target PP be 0.9. Let $\lambda=0.7$, then w_21=0.7*0.9*0.4=0.252 and w_22=0.3*0.5=0.15. Hence, when the dependency between the two sentences are considered, sentence 2 is closer to PII policy than cookies policy.

In FIG. 3A, w represents the weightage for the mapping between set C and set P elements. It represents the closeness level (or closeness coefficient) between elements of set C and P, which is computed using the equation mentioned above. ($w_{cp} = \lambda t_{c-1,c} w_{c-1,p} + (1-\lambda) m_{cp}$)

The mathematical model for the mapping is described as follows:

The input includes the following:

C, which is a set of target PP segments

P, which is a set of template PP segments $w_{cp}$, which is a measure of closeness (or the first closeness coefficient) of $c^{th}$ target policy segment with $p^{th}$ template PP segment.

The decision variables include:

$$x_{cp} = \begin{cases} 1, & \text{if } c^{th} \text{ target policy segmet is assigned to } p^{th} \text{ template policy segment privacy policy} \\ 0, & \text{otherwise} \end{cases}$$

The Optimization model is presented as:

Objective: Max $\Sigma_{c \in C} \Sigma_{p \in P} w_{cp} x_{cp}$ (Maximize the total closeness)

Constraint—1: $\Sigma_{p \in P} x_{cp} = 1$ $\forall c \in C$ (Every target PP segment is assigned to exactly one template PP segment)

Bound: $x_{cp} \in \{0,1\}$ $\forall c \in C, p \in P$

Algorithm 1:

For each $c \in C$

Find $p^* = \text{argmax}_{p \in P} w_{cp}$

Set $x_{cp^*} = 1$

Set $x_{cp} = 0 \forall p \in P - \{p^*\}$

Algorithm 1 iterates over each sentence (or target PP segment) in the target PP segment and finds the best template PP segment with maximum $w_{cp}$ value. The sentence is mapped to the template policy with highest value of the first closeness coefficient.

Similar to the mapping methodology applied at 204, a second closeness coefficient is determined at 208 to assign weightage to the mapping connectivity of segments from the target PP and the template PPs. The target PP-template PP segment pairs (obtained as a result of mapping between the target PP and the template PPs at 204) are mapped to a plurality of video template segments stored in the video repository to obtain a set of mapped PP segment-video template pairs. The set of mapped PP segment-video template pairs includes a set of video template segments from amongst the plurality of video template segments. Mapping is performed by determining a second closeness coefficient between each of the set of mapped PP segment-policy template pairs and the plurality of video template segments. In an embodiment, the target PP may have some new or additional content (or sentences or segments) that may not be present in the template PPs. Hence, the content repository is caused to store the plurality of video template segments for mapping to the video template segments to the policy segment-policy template pairs. Let set P, represents the plurality of template PP segments, where $p_1, p_2, \ldots, p_n$ are the contents in the plurality of template PP segments. For example: p1: personal information; p2: cookies. Let set C, represents the target PP segments that are mapped against each of the template PP segments. Let Set Q, represent the combination of the target PP content (or segments) and template PP content (or segments). Let Set V, represents the video templates, where $v_1, v_2, \ldots, v_n$ are the individual video template segments from the video repository representing different content (target PP segments) from the privacy policy.

The mathematical model is described below as:
Input:
V—Set of video templates
Q—Combination set of the template PP segments and its mapping with target PP
$t_{qv}$—Closeness of $q^{th}$ template PP segment and USPP with $v^{th}$ video template
Decision Variables:

$$y_{qv} = \begin{cases} 1, & \text{if } q^{th} \text{ template } PP \text{ segment is assigned} \\ & \text{to } v^{th} \text{ video template segment} \\ 0, & \text{otherwise} \end{cases}$$

Optimization Model:
Objective: Max $\Sigma_{q \in Q} \Sigma_{v \in V} t_{qv} y_{qv}$ (Maximize the total closeness)
Constraint—1: $\Sigma_{v \in V} y_{qv}=1$ $\forall q \in Q$ (Every repository segment privacy policy is assigned to exactly one video template)
   Bound: $y_{qv} \in \{0,1\} \forall v \in V, q \in Q$
Algorithm 2:
   For each $q \in Q$
   Find $v^* = \text{argmax}_{v \in V} t_{qv}$
   Set $y_{qv^*}=1$
   Set $y_{qv}=0$ $\forall v \in V - \{v^*\}$ The Algorithm 2 iterates over each template PP segment and finds the best video template segment with maximum $t_{qv}$ value (or second closeness coefficient). The template PP segment is mapped to the video template segment with highest value of second closeness coefficient. An example representation of mapping of the set of mapped policy segment-policy template pairs with a plurality of video template segments stored in a video repository is illustrated further with reference to FIG. 4B.

Once the video template segments are created, they have to be sequenced in an order. In an embodiment, the video template segments may be sequenced in an optimal order in accordance with one or more preferences associated with the target entity at 208. The following optimization model may be utilized for sequencing the set of video template segments.

In an embodiment, sequencing the set of video template segments in the optimal order includes minimizing an objective function representative of a minimal reshuffling in a precomputed sequence of the set of video template samples, given by equation:

$$\Sigma_1^N |O_i - X_i|$$

Where,
N is the number of the set of policy sections,
O is a precomputed sequence of the set of video templates derived by combining the one or more preferences, and
   $X_i$ is the position of segmented policy sections $I \in [1 \ldots N]$
   Such that:
   all different ($X_i$ $\forall$ i $\in [1,N]$) wherein every video template to be placed in a unique position, and for all hard order: $X_i < X_j$ such that a strict successor and predecessor relation is maintained.

Herein, the precomputed sequence of the set of video template samples is indicative of a thought process associated with a sequence in the content of the target PP while designing the target PP. Said sequence may be captured in the target PP segments, as described below by following steps 1-3.

At Step 1: The mapping between the target PP segments and the template PP segments is obtained. After solving the mapping problem of target PP segments to the template PP segments, the output of the model is content matching of target PP segments with the template PP segments. Each content (present in the form of a sentence) of the target PP segments represented by $c_i \in C$ is mapped to the template PP segments. Example: P1→{c1, c2}; P2→{c3, c4, c11, c12}; P3→{8, 9, 10} and P4→{c5, c6, c7}. Here P1, P2, . . . , Pn are the template PP segments, example PII, cookies, and so on.

Step 2: Obtain a sequence significance score for generating the precomputed sequence. It is computed, using the position of the content in the target PP. Lower sequence significance score of a target PP segment compared to other target PP segment implies the video template associated with the PP segment must appear before the other element.

For example, say P1 is mapped with the content {c3, c4} and likewise, P2 is mapped with {c1, c2}. Then according to its relative position, P1 significance in the sequence is {3+4=7}, while for P2 it is {1+2=3}. Hence, P2 (target PP segment) and its associated video template would appear before P1. Second example: For the above stated example, P1→{c1, c2}; P2→{c3, c4, c11, c12}; P3→{8, 9, 10} and P4→{c5, c6, c7}. Sequence Significance Score is P1→{3}; P2→{30}; P3→{27} and P4→{18}

Step 3: Sort the sequence significance score and obtain the precomputed sequence [denoted by O, in the mathematical model Precomputed Sequence: [P1, P4, P3, P2] and its associated video sequence [VT1, VT4, VT3, VT2], where VT represent the video template associated with the template PP segment.

In an embodiment, the set of video template segments may be stitched together in the optimal order (as descried above) to obtain the video format of the text based PP (of the target PP).

In an embodiment, the set of video template segments may be customized using one or more machine learning models. In an embodiment, customizing the set of video template segments includes processing the set of video template segments using a plurality of visual assets and audio assets. Examples of plurality of visual assets may include, but are not limited to, characters, icons, text, font, boxes, animations, and color. In an embodiment, customizing the video template segments may include, for example, performing one or more of change in-video characters, adding brand identity to the video template segments, the brand identity comprising logo, target entity name and related content within the video template segments, changing color theme of the video templates, adding and modifying credits within the video template segments, speed progression of the video snippets on timeline, and sequencing of the video template segments as per the privacy policies. For example, if an employee of a company (say ABC company) wants to make the video much more in-sync with their company's identity, then the disclosed system may enable addition of company's logo at different places in the video like front page, header, footer, end, and the like. Such additions may be processed by the disclosed system by way of one or more user inputs. Further, the employee can upload logo files, images in jpg, .svg or .png format into the system for editing the video snippets. The system may also enable change in background color of visuals to something related to the company. For example, if the ABC company is generating a video-based privacy policy, then the major color theme can be blue or any other color. Color from a predefined color palette can be selected or alternative a HEX value of the color (e.g., #FFFFFF for white) may be obtained (from user interface) to change the theme. This helps in customization of the video snippets for ABC Company. In addition, characters can be selected (via user inputs) from predefined set within the video. For example, to represent a data practice about children, a character representing a baby can be selected. For the personal information section, male female characters representing different age groups can be selected. These visual characters may be pre-defined in the system and may be limited in number so that the system reduces randomness in the output.

In further addition, the sequencing of the plurality of sections defined by the system may not be similar to the content of ABC Company's privacy policies. To solve this issue, the system may also provide an option to change the sequence of the video snippets. There may be a possibility that the users may want to show the video snippets related to customer choices before personal information so they may sequence the video snippets as per their need. The output of the customization may include the video snippets sequenced in a format relatable to the text-based privacy policies and brand identity of the target privacy policy.

Herein, the video template segments created corresponding to the segments of the target PP may be reused, with minimal modifications, for other target entities. For instance, the video template segments created for an ecommerce website may be reused to create similar video template segments (with certain modifications) for another ecommerce website. Accordingly, with an increase in video policies of different organizations or entities, the reusable content may also increase resulting in reduced man hours and efforts required for creating video-based policies of other organizations.

In an embodiment, the system may automatically map out a plurality of predefined narratives of the video snippets from the PP template repository and presents them to the user in text format. Each video snippets comprises a predefined audio narrative. For example, under 'customer choices', there may be a section for toggling location services ON/OFF. In this case, the pre-defined audio narrative may say: 'Customer can toggle their location services ON/OFF From their devices anytime they want'. However, if the user want to change the audio to something else like: 'Customer can switch of their location services, But doing so might disable some features'

In the above scenario, the users may be provided with the narrative in text-based format. The users can edit, modify, remove or add content to the narratives, which passes through a text-audio converter. The text-audio converter converts the text with a lookup table stored in a database creating a sequence of phonemes, which comes out as an audio format. This acts as a voice over for the video snippets, which can be edited iteratively to generate the narration for the video snippets. The system may also provide additional feature like selection of voice type (e.g., male/female), adjusting pitch, tone and tempo of the audio, and adding the text narratives as subtitles for the video. The output can be converted into compressed form for reduced size of the video. Final video could be a standalone file in the memory 102, which can be saved, shared, uploaded or transferred among other devices or systems.

Figure 4A:
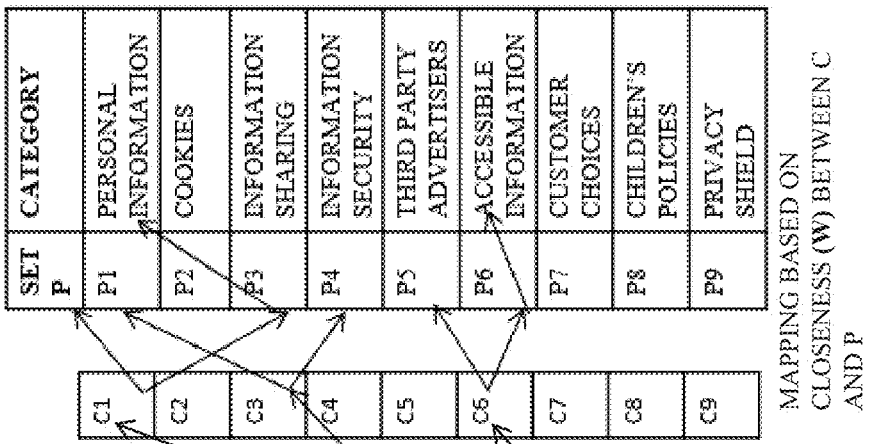
FIGS. 4A-4D illustrate an example representation of automated conversion of text-based privacy policy (PP) to video, in accordance with an example embodiment of the disclosure.
Figure 4B:
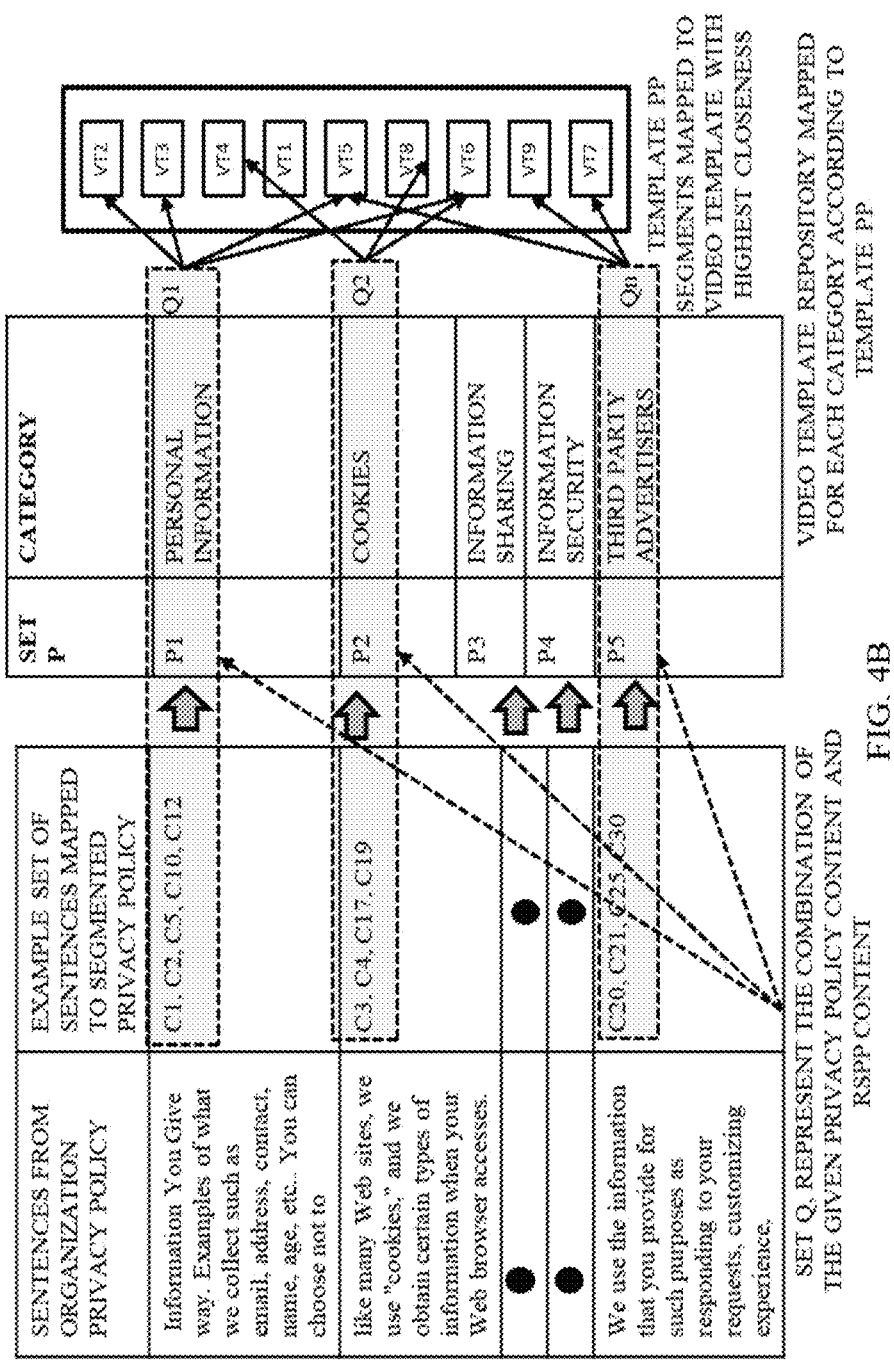
Figure 4C:
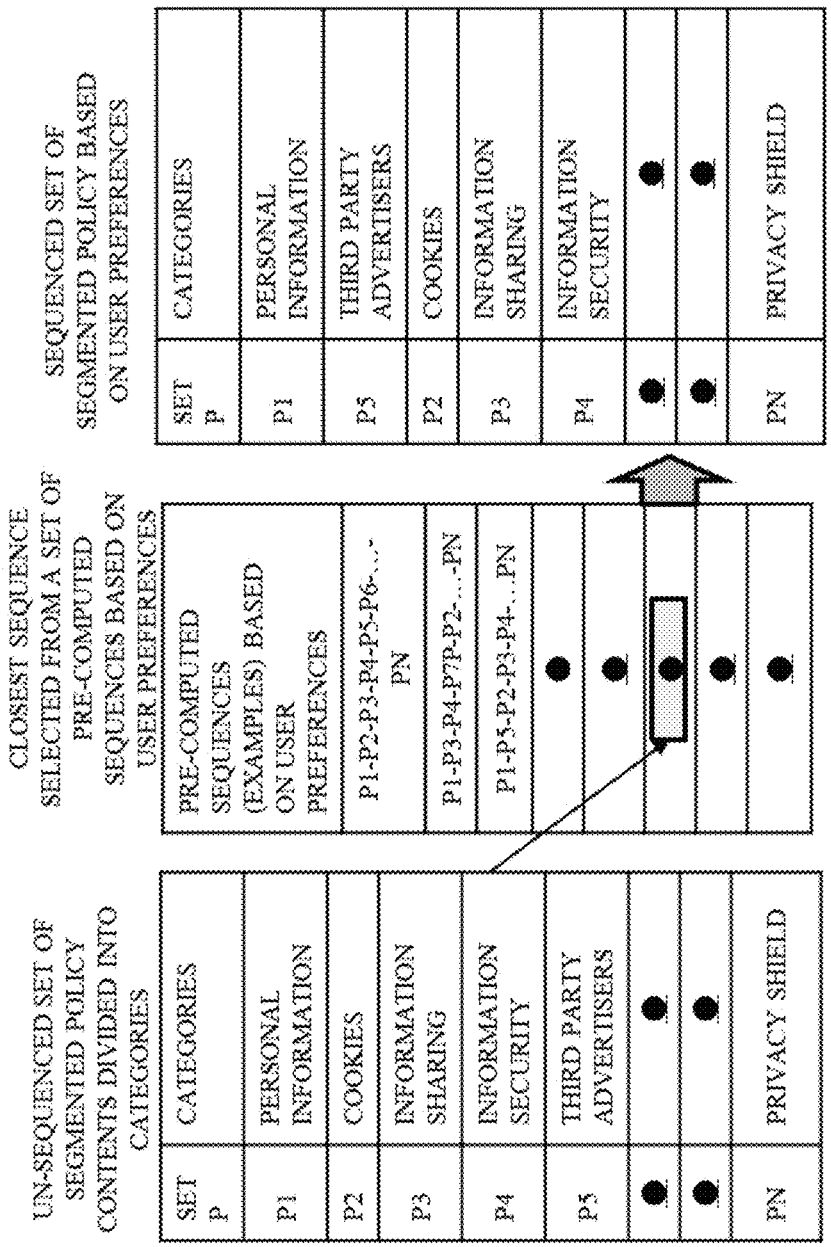
Figure 4D:
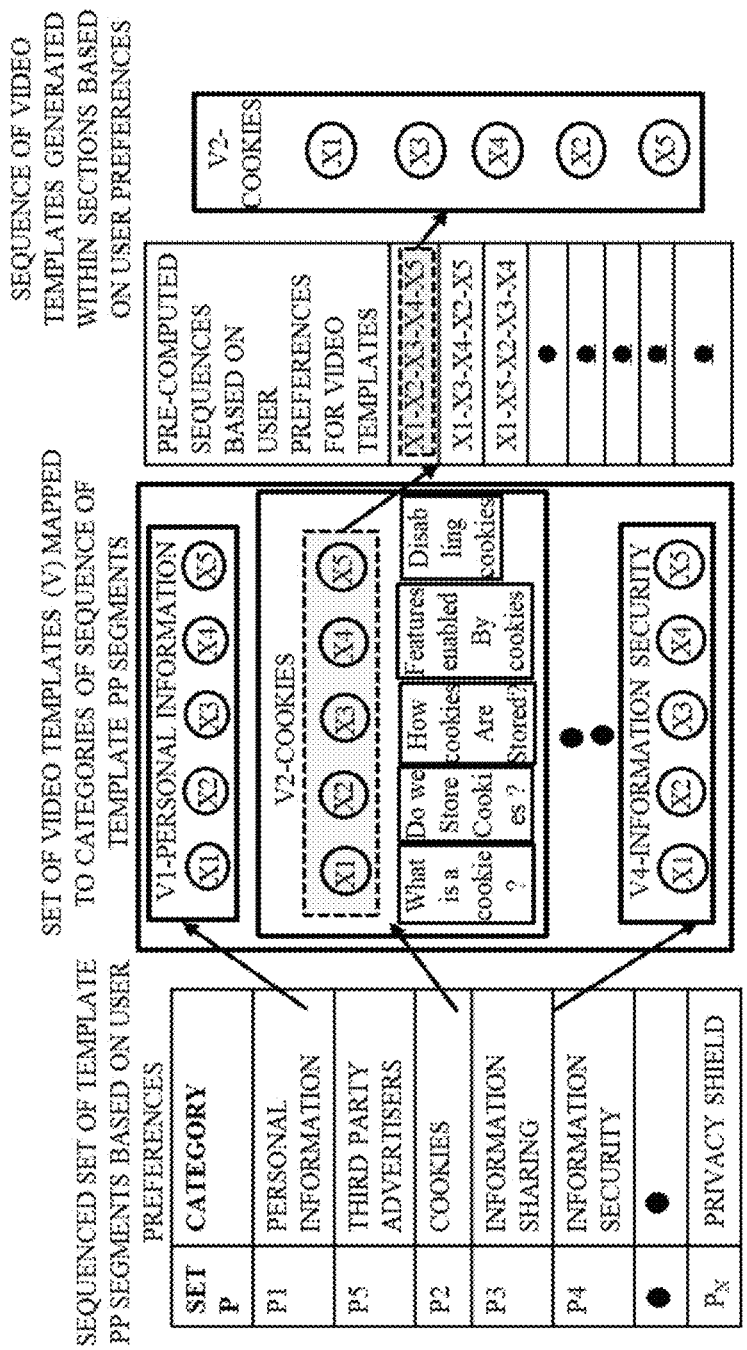

An example illustrating the conversion of a target PP (of an online entity) into video format is described further with reference to FIGS. 4A-4D. Particularly, FIG. 4A illustrates mapping of segments (or sentences) from the target PP to the template PP segments stored in the PP repository. FIG. 4B illustrates mapping of contents from the template PP segments to the video templates stored in the video repository. FIG. 4C illustrates sequencing of categories using a set of pre-computed sequences based on user preferences. FIG. 4D illustrates sequencing of video templates within categories of privacy policy using another set of pre-computed sequences based on user preferences.

In an example scenario, the disclosed system was tested after analyzing privacy policies of 16 different organizations ranging from e-Commerce, retail, technology, entertainment, banking and finance. It was observed that majority of the content of the privacy policies of the different organizations can be categorized into distinct sections with similar agendas. To solve the purpose, short video clips (video templates) of all the individual segments of the privacy policies were created. For achieving this, one of the privacy policy was selected as a case study and a quantitative analysis is performed. To summarize the selected privacy policy, a number of participants from a random group of people with relatively higher educational background were crowd sourced. Reduction in overall content was observed and was noted to be close to 40 percent (including redundant content). Further, remaining 60 percent content was conveyed through video. Further, modular video sections were created to become more lucid to the audience. It was observed that around 63.9 participants were required to refer the privacy policy of a website in past scenarios. However, many participants never read the privacy policy of a website whenever they visited one. Some participants had not read the complete text in case they were presented with a situation to refer a privacy document. However, in comparison to convention methods, the video-based privacy policy based methods are more effective both in terms of time taken for completion and accuracy of answers. In quantitative terms, average time for completing survey for text-based privacy policy was 32 minutes and 30 seconds.

In an experimental scenario, a comparative study was performed to determine the effect of text-based PP and video based PP. For the purpose of experiment, 64 participants were considered who were divided into four groups. Each group was assigned to full text-based policy and video-based policy for both Amazon and Netflix. Each participant was presented with a questionnaire that consisted of multiple-choice questions (with more than one correct answers) and pre and post feedback forms, which contained responses, based on Likert scale for psychometric analysis. The objective of the survey was to evaluate their experience with the two different mediums of delivering privacy policy content. For this part of the study, printed surveys were selected. Time duration for giving responses was measured for analogical inference of the effectiveness of content. The participants were allowed to refer back and forth to text or video-based policy while answering the questions. This presented an overall understanding of the effectiveness of finding information between two different mediums of communication.

It was observed that
- Around 62% participants have at least faced a situation once where they visited the policy page (directed automatically on the website or clicked by user) but still majority of them skipped reading.
- Out of all participants, 73.45% stated that they never read the privacy policy of a website whenever they visited one.
- 81% of participants said, they would not read the complete text in case they were presented with a situation to refer a privacy document.

Figure 5A:
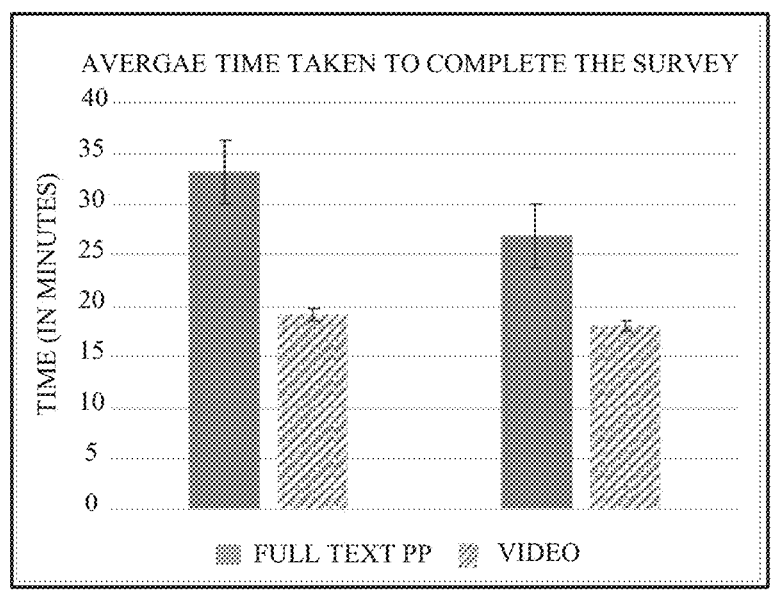
FIGS. 5A-5F illustrate results of comparative analysis performed for analyzing the video based policy vis-a-vis text based policy, in accordance with an example embodiment.
Figure 5B:
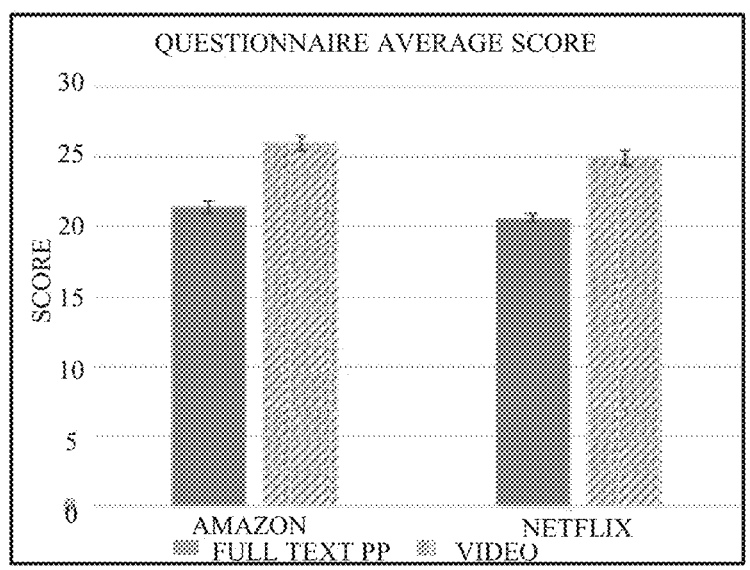

Comparison in terms of completion time: The duration and accuracy of the questions answered by the participants was compared with a confidence interval of 95%. The duration of completion of the survey for each participant was measured from the time they receive the questionnaire till they complete and submit the same. FIG. 5A depicts the comparative analysis of the average time for completing the survey with error bars. The average time for completing the survey for full text-based privacy policy of Amazon.com was 33 minutes and 08 seconds. This was reduced to an average of 19 minutes and 11 seconds for the video-based survey resulting in around 42.07% reduction from the full text based policy.

For Netflix, average time for completing the survey for full text-based privacy policy was 26 minutes & 48 seconds with an average reduction of 32.63% for video-based policy resulting in 18 minutes and 4 seconds.

Comparison in terms of score: The average score for the video-based survey for Amazon.com privacy policy increased by 21.57% as compared to full text based policy. There was an increase of 21.21% in the average score for video-based policy of Netflix over the full-text version. Average scores of the questionnaire based on the privacy document depicted in FIG. 4B provided positive results for the video-based privacy policy compared to text-based version.

Figure 5C:
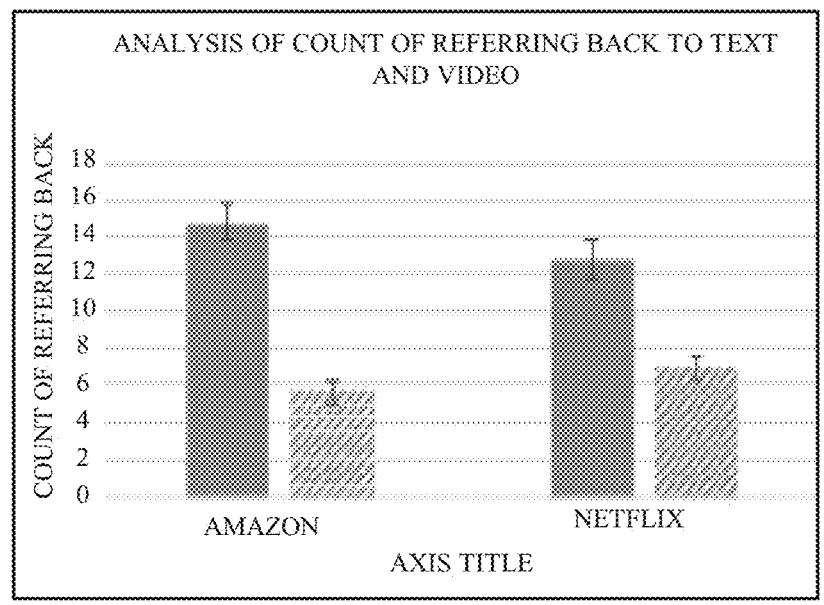
Figure 5D:
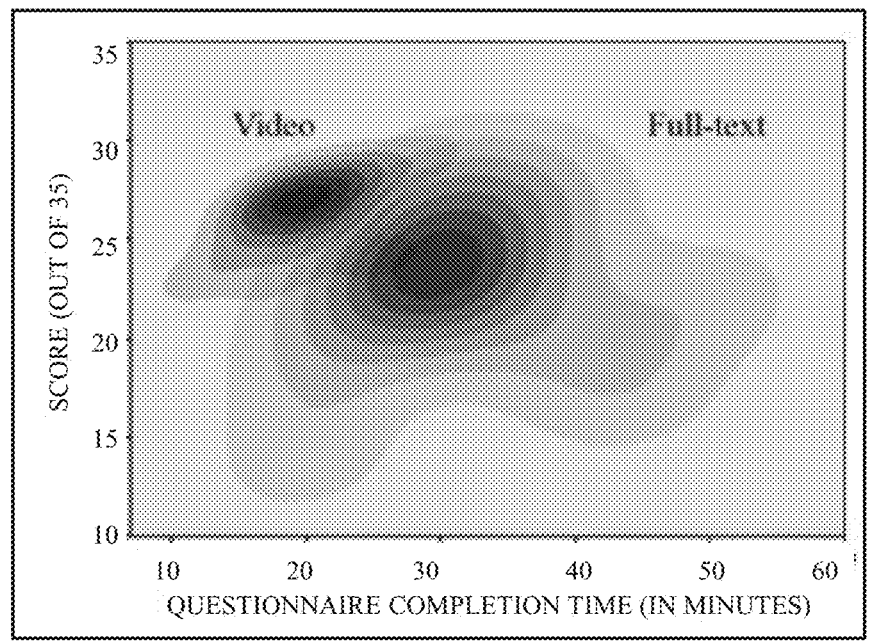
Figure 5E:
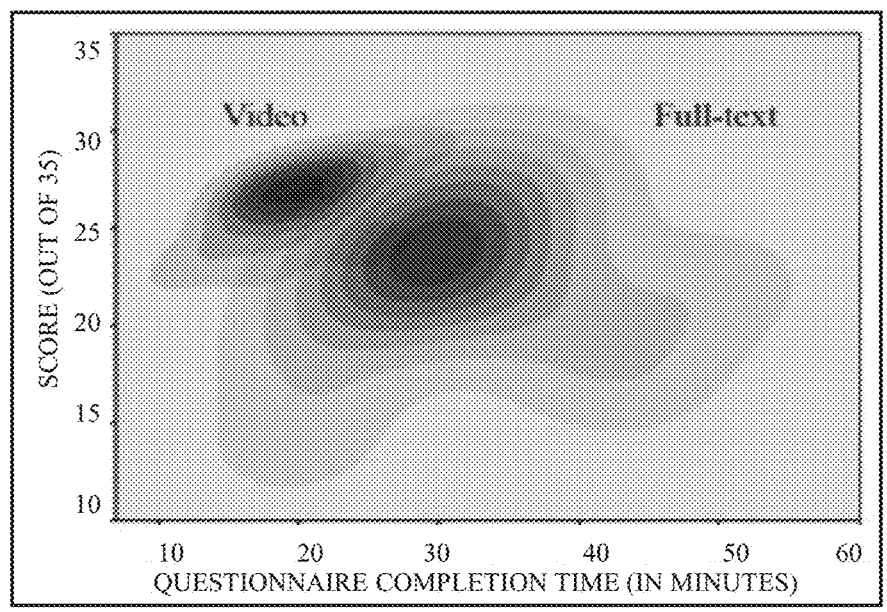

Comparison in terms of count of referring back: The count of referring back to full-text and video policies while completing the questionnaire was gathered using selective observation technique in a laboratory setting. Analysis of the count for both Amazon and Netflix is shown in FIG. 5C. For full text-based version of Amazon's policy document, the count averaged to 14.75 times per participant while for the video it was limited to 6 times per participant resulting in an average reduction of 57.14%. Similarly, for full-text version of Netflix's policy, the average count was 13 times which reduced to 7 times (reduction by 46.15%) for video-based version. This data facilitated in understanding the fact that successive visual representation with less information guides the learning model of the viewer thus letting them go through a short story format instead of open sea of information.

Comparison in terms of consistency: The scatter plot shown in FIG. 5D-5E using Kernel Density Estimation clearly illustrates the fact that the overall responses of the participants in case of video shifted towards the top left part of the graph. This suggests that participants consumed less time with higher accuracy rate for answering the questionnaire in case of video-based policies. The plots also show higher dispersion in scores for full-text versions, which signifies lower consistency and predictability for full-text privacy policies.

Statistical analysis: An independent-samples t-test was conducted to compare time consumed in answering the questionnaire for full-text and video-based policies. For Amazon.com: There was a significant difference in the time (minutes) for full-text policy (M=33.125, SD=7.948794) and video-based policy (M=19.19, SD=4.34) conditions; t (23)=6.15, p=0.0000014. For Netflix: Full-text policy (M=26.81, SD=6.51) and video-based policy (M=18.0625, SD=3.37) conditions; t (23)=4.77, p=0.000041. These results suggest that video-based policy does have an effect on time consumed by participants while answering the questionnaire.

Specifically, the results suggest that when participants answered the questionnaire using video-based policy, their response time was quicker with better delivery of the privacy policy content as compared to full text-based policy.

Similarly, an independent-samples t-test was conducted to compare score of participants for correctly answering the questionnaire of full-text and video-based policies.

For Amazon.com: There was a significant difference in the score (out of 35) for full-text policy (M=21.44, SD=4.11) and video-based policy (M=26.06, SD=1.91) conditions; t (21)=4.08, p=0.00027.

For Netflix: There was a significant difference in the score (out of 30) for full-text policy (M=20.62, SD=3.03) and video-based policy (M=25, SD=1.96) conditions; t (26)=4.84, p=0.000025. These results suggest that when participants answered the questionnaire using video-based policy, their score increased as compared to text-based policy indicating improved comprehensibility of the content.

Figure 5F:
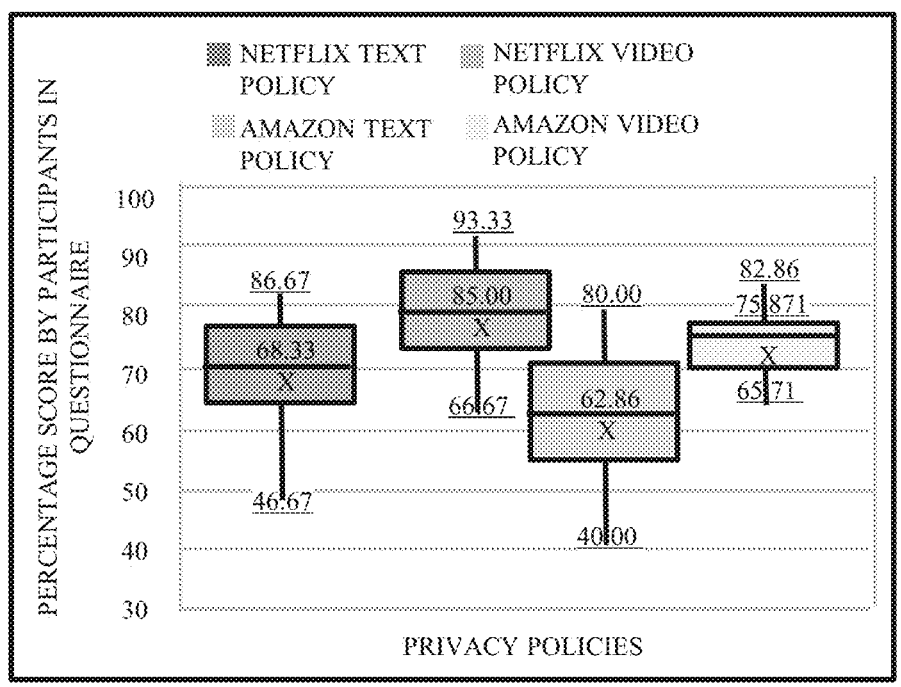

Comparison in terms of accuracy rate: In the comparison of video policy to text-based policy, we found out that more number of participants scored over 80% in the questionnaire for video policies. FIG. 5F depicts distribution of participants scoring at different levels for both video and text-based policies. For both Amazon and Netflix, participant's mean percentage scores were higher for video policy as compared to text-based policy. 87.34% of the participants who surveyed for video-based policies scored above 70% in the questionnaire. While 66% participants scored below 70% for text-based policies. Thus, video policies out-performed text-based policies in terms of percentage scores in the questionnaires.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed herein provides method and system that enables communication of online text-based privacy policy statements in the form of a video so as to effectively engage users towards understanding of the content of privacy policy. In an embodiment, the disclosed system combines various categories of available privacy policies to automate the conversion of the text-based policy into video. For example, in an embodiment the system maps the segments of the PP with the segments derived from existing PPs (stored in a repository), and then maps the identified PP segments with video segments (stored in a repository) to identify relevant video snippets corresponding to the segments of the privacy policy. The identified relevant video snippets are then arranged in an optimal sequence to obtain a video corresponding to the at least a portion of the privacy policy. Herein, the video may be obtained for different sections of the PP. Alternatively, the disclosed system may be capable stitching the videos corresponding to each of the sections of the PP and provide a video form of the text-based privacy policy.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
receiving an input associated with a privacy policy (PP) of a target entity, via one or more hardware processors, the input comprising a plurality of target PP segments;
classifying, via the one or more hardware processors, the plurality of target PP segments by mapping the plurality of target PP segments with a plurality of template PP segments stored in a PP repository to obtain a set of mapped target PP-template PP segment pairs, wherein mapping is performed by determining a first closeness coefficient between each of the plurality of target PP segments and the plurality of template PP segments;
mapping, via the one or more hardware processors, the set of mapped target PP-template PP segment pairs with a plurality of video template segments stored in a video repository to obtain a set of mapped target PP-video template segment pairs, wherein the set of mapped target PP-video template segment pairs comprises a set of video template segments from amongst the plurality of video template segments, wherein mapping is performed by determining a second closeness coefficient between each of the set of mapped target PP-template PP segment pairs and the plurality of video template segments; and
sequencing the set of video template segments in an optimal order based on one or more preferences associated with the target entity, via the one or more hardware processors, wherein sequencing the set of video template segments in the optimal order comprises minimizing an objective function representative of a minimal reshuffling in a precomputed video template sequence of the set of video template samples, while considering dependencies of the set of video template segments as constraints to be met, wherein obtaining the precomputed video template sequence comprises:
computing a set of sequence significance scores for the plurality of target PP-template PP segment pairs, each target PP-template PP segment pair of the plurality of target PP-template PP segment pairs mapping a target PP segment with one or more template PP segments, wherein computing a sequence significance score for the each target PP-template PP segment pair comprises determining positions of the one or more template PP segments, and computing the sequence significance score using the positions of the one or more template PP segments; and
sorting the set of sequence significance scores to obtain the precomputed sequence.

2. The method of claim 1, wherein each of the plurality of template PP segments is associated with a label.

3. The method of claim 1, wherein the first closeness coefficient between a target PP segment from amongst the plurality of target PP segments and a template PP segment from amongst the plurality of template PP segments is computed as a function of semantic similarity and syntactic similarity associated with the target PP segment and at least one target PP segment preceding the target PP segment with respect to the plurality of template PP segments.

4. The method of claim 1 further comprises customizing the set of video template segments, wherein customizing the set of video template segments comprises processing the set of video template segments using a plurality of visual assets and a plurality of audio assets, and wherein an asset of the plurality of visual assets comprises characters, icons, text, font, boxes, animations, and color.

5. The method of claim 4, wherein customizing the set of video template segments comprises performing one or more of changing in-video characters, adding brand identity to the set of video template segments, the brand identity comprising logo, target entity name and related content within the video template segments, changing color theme of the set of video templates, adding and modifying credits within the set of video template segments, speed progression of the video template segments on a timeline, and sequencing of the video template segments according to the target entity.

6. A system, comprising:
a memory storing instructions;
one or more communication interfaces; and
one or more hardware processors coupled to the memory via the one or more communication interfaces, wherein the one or more hardware processors are configured by the instructions to:
receive an input associated with a privacy policy (PP) of a target entity the input comprising a plurality of target PP segments;
classify the plurality of target PP segments by mapping the plurality of target PP segments with a plurality of template PP segments stored in a PP repository to obtain a set of mapped target PP-template PP segment pairs, wherein mapping is performed by determining a first closeness coefficient between each of the plurality of target PP segments and the plurality of template PP segments;
map the set of mapped target PP-template PP segment pairs with a plurality of video template segments stored in a video repository to obtain a set of mapped target PP-video template segment pairs, wherein the set of mapped target PP-video template segment pairs comprises a set of video template segments from amongst the plurality of video template segments, wherein mapping is performed by determining a second closeness coefficient between each of the set of mapped target PP-template PP segment pairs and the plurality of video template segments;

sequence the set of video template segments in an optimal order based on one or more preferences associated with the target entity, wherein to sequence the set of video template segments in the optimal order, the one or more hardware processors are configured by the instructions to minimize an objective function representative of a minimal reshuffling in a precomputed video template sequence of the set of video template samples, while considering dependencies of the set of video template segments as constraints to be met, wherein to obtain the precomputed video template sequence, the one or more hardware processors are configured by the instructions to:

compute a set of sequence significance scores for the plurality of target PP-template PP segment pairs, each target PP-template PP segment pair of the plurality of target PP-template PP segment pairs mapping a target PP segment with one or more template PP segments, wherein to compute a sequence significance score for the each target PP-template PP segment pair, the one or more hardware processors are configured by the instructions to determine positions of the one or more template PP segments, and compute the sequence significance score using the positions of the one or more template PP segments; and sort the set of sequence significance scores to obtain the precomputed sequence.

7. The system of claim 6, wherein each of the plurality of template PP segments is associated with a label.

8. The system of claim 6, wherein the one or more hardware processors are configured by the instructions to calculate the first closeness coefficient between a target PP segment from amongst the plurality of target PP segments and a template PP segment from amongst the plurality of template PP segments as a function of semantic similarity and syntactic similarity associated with the target PP segment and at least one target PP segment preceding the target PP segment with respect to the plurality of template PP segments.

9. The system of claim 6, wherein the one or more hardware processors are configured by the instructions to customize the set of video template segments, wherein customizing the set of video template segments comprises processing the set of video template segments using a plurality of visual assets and a plurality of audio assets, and wherein an asset of the plurality of visual assets comprises characters, icons, text, font, boxes, animations, and color.

10. The system of claim 6, wherein the one or more hardware processors are configured by the instructions to customize the set of video template segments by performing one or more of changing in-video characters, adding brand identity to the set of video template segments, the brand identity comprising logo, target entity name and related content within the video template segments, changing color theme of the set of video templates, adding and modifying credits within the set of video template segments, speed progression of the video template segments on a timeline, and sequencing of the video template segments according to the target entity.

11. One or more non-transitory machine readable information storage mediums comprising one or more instructions which when executed by one or more hardware processors cause:

receiving an input associated with a privacy policy (PP) of a target entity, via one or more hardware processors, the input comprising a plurality of target PP segments;

classifying, via the one or more hardware processors, the plurality of target PP segments by mapping the plurality of target PP segments with a plurality of template PP segments stored in a PP repository to obtain a set of mapped target PP-template PP segment pairs, wherein mapping is performed by determining a first closeness coefficient between each of the plurality of target PP segments and the plurality of template PP segments;

mapping, via the one or more hardware processors, the set of mapped target PP-template PP segment pairs with a plurality of video template segments stored in a video repository to obtain a set of mapped target PP-video template segment pairs, wherein the set of mapped target PP-video template segment pairs comprises a set of video template segments from amongst the plurality of video template segments, wherein mapping is performed by determining a second closeness coefficient between each of the set of mapped target PP-template PP segment pairs and the plurality of video template segments; and sequencing the set of video template segments in an optimal order based on one or more preferences associated with the target entity, via the one or more hardware processors, wherein sequencing the set of video template segments in the optimal order comprises minimizing an objective function representative of a minimal reshuffling in a precomputed video template sequence of the set of video template samples, while considering dependencies of the set of video template segments as constraints to be met, wherein obtaining the precomputed video template sequence comprises:

computing a set of sequence significance scores for the plurality of target PP-template PP segment pairs, each target PP-template PP segment pair of the plurality of target PP-template PP segment pairs mapping a target PP segment with one or more template PP segments, wherein computing a sequence significance score for the each target PP-template PP segment pair comprises determining positions of the one or more template PP segments, and computing the sequence significance score using the positions of the one or more template PP segments; and sorting the set of sequence significance scores to obtain the precomputed sequence.

\* \* \* \* \*